United States Patent [19]

Wang

[11] Patent Number: 5,563,606
[45] Date of Patent: Oct. 8, 1996

[54] DYNAMIC MAPPING APPARATUS FOR MOBILE UNIT ACQUISITION AND METHOD THEREFOR

[75] Inventor: Theresa C. Y. Wang, Scottsdale, Ariz.

[73] Assignee: Motorola, Inc., Schaumburg, Ill.

[21] Appl. No.: 317,064

[22] Filed: Oct. 3, 1994

[51] Int. Cl.⁶ ............................... H04B 7/185; G01S 5/02
[52] U.S. Cl. .................... 342/354; 342/357; 455/13.3
[58] Field of Search .................................. 342/352, 353, 342/354, 357; 455/12.1, 13.3, 33.1

[56] References Cited

U.S. PATENT DOCUMENTS

| | | | |
|---|---|---|---|
| 5,073,900 | 12/1991 | Mallinckrodt | 375/1 |
| 5,161,248 | 11/1992 | Bertiger et al. | 455/17 |
| 5,239,670 | 8/1993 | Schwendeman et al. | 455/13.1 |
| 5,355,138 | 10/1994 | Cances et al. | 342/354 |
| 5,408,237 | 4/1995 | Patterson et al. | 342/354 |
| 5,422,647 | 6/1995 | Hirshfield et al. | 342/354 |

OTHER PUBLICATIONS

Modern Science & Technology of Telecommunications, Nov. 1991, No. 142, Scientific & Technical Information Center of MPT of China.

Primary Examiner—Gregory C. Issing
Attorney, Agent, or Firm—Gregory J. Gorrie

[57] ABSTRACT

A called subscriber unit's geographic location is provided by a gateway and translated to location coordinates of a global coordinate system. The gateway identifies an orbiting satellite communication station servicing the subscriber unit's location, and sends the subscriber unit's ID and location data to the satellite. The subscriber unit's location data is translated to an angle and range relative to the satellite's nadir using the satellite's ground track data. The angle and range are mapped to an antenna beam where the subscriber unit is located using a look-up table onboard the satellite. An acquisition or ring-alert signal is transmitted within the antenna beam where the subscriber unit is located. When the range is outside the satellite's footprint, the subscriber unit's ID and location data are routed directly to another satellite currently servicing that location.

22 Claims, 5 Drawing Sheets

DYNAMIC MAPPING APPARATUS FOR MOBILE UNIT ACQUISITION AND METHOD THEREFOR

TECHNICAL FIELD OF THE INVENTION

The present invention relates generally to cellular communication systems that broadcast within multiple antenna beams and communicate with users located within individual beams. More specifically, the present invention relates to satellite communication systems that transmit pages and ring-alerts within multiple antenna beams.

BACKGROUND OF THE INVENTION

Cellular communication systems ring called parties by sending ring-alert messages on a cell's broadcast channels. Ring-alert messages are directed to particular subscriber units. Subscriber units monitor broadcast channels to determine when a ring-alert message is directed to a particular subscriber unit.

In cellular systems, ring-alerts are generally broadcasted in all cells of an entire geographic region where the called-party may reside. Broadcasting each ring-alert within each cell requires a certain amount of additional energy. In terrestrial cellular systems, there is no need to conserve energy because the energy supply is virtually unlimited.

However, in a satellite communication system, where subscriber units receive ring-alerts from satellite communication nodes, it is desirable to conserve energy by broadcasting ring-alerts in as few cells or antenna beams as possible, since a satellite's energy supply is extremely limited. A satellite's power is generally limited to that supplied by its solar panels and its batteries. Energy expended for ring-alerts reduces the amount of energy available for other communications.

Furthermore, in non-geo-synchronous multi-beam satellite communication systems, is extremely difficult to acquire a large number of mobile subscriber units because the location of a satellite's antenna beams is continually changing with respect to the earth's surface. This is true even though the locations of the mobile subscriber units can be provided to the satellite. This problem increases substantially when the satellites are in a low-earth orbit (LEO) because the relative velocity between the satellite and the subscriber unit is significant. For initial acquisition of a mobile subscriber unit, ring-alerts and pages are desirably directed within the proper antenna beam of the proper satellite in a time-efficient manner to provide satisfactory service to users placing calls, and to conserve satellite energy.

Thus what is needed are a method and apparatus that quickly and accurately determines a location of a mobile subscriber unit within a specific antenna beam. Moreover, what is needed are a method and apparatus that quickly maps an antenna beam pattern with a geographic location of a mobile subscriber unit so that acquisition can be achieved quickly and accurately. What is also needed are a method and apparatus to conserve energy onboard a satellite communication station that issues ring-alerts and pages. Furthermore, what is needed are a method and apparatus for reducing the amount of power expended in transmitting ring-alerts in satellite-based communication systems. What is also needed are a method and apparatus for broadcasting ring-alerts and pages in as few antenna beams as possible in a satellite communication system.

DETAILED DESCRIPTION OF THE DRAWINGS

The present invention provides, among other things, a method and an apparatus for dynamically mapping a subscriber unit's geographic location to specific antenna beams of a satellite communication system. The power expended for ring-alerts and acquisition is substantially reduced. Furthermore, the time for acquisition of a subscriber unit is substantially reduced. In addition to ring-alerts and subscriber unit acquisition which are generally broadcasted to two-way communication devices, the present invention also applies to paging messages broadcasted to one way communication devices.

A "satellite" is defined herein to mean a man-made object or vehicle intended to orbit earth and includes both geostationary and orbiting satellites and/or combinations thereof including low earth orbiting (LEO) satellites. A "constellation" is defined herein to mean an ensemble of satellites arranged in orbits for providing specified coverage (e.g., radio communication, photogrammetry, etc.) of portion(s) or all of the earth. A constellation typically includes multiple rings (or planes) of satellites and may have equal numbers of satellites in each plane, although this is not essential. As used herein the terms "cell" and "antenna beam" are not intended to be limited to any particular mode of generation and include those created by either terrestrial or satellite cellular communications systems and/or combinations thereof. The present invention is applicable to systems including satellites having low-earth, medium-earth and geo-synchronous orbits. Additionally, it is applicable to orbits having any angle of inclination (e.g., polar, equatorial or other orbital pattern).

Figure 1:
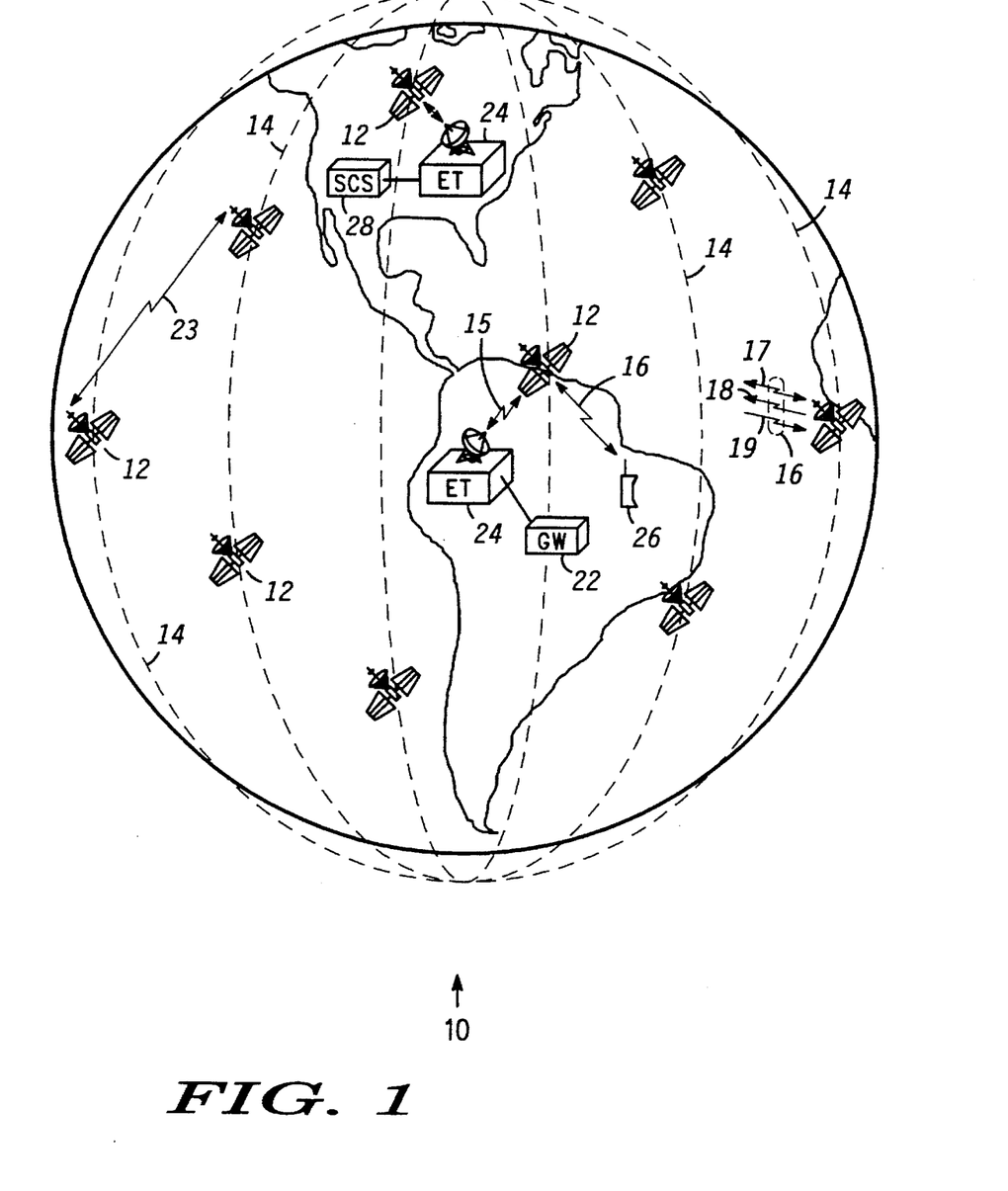
FIG. 1 illustrates a highly simplified diagram of a satellite-based communication system with which the present invention may be practiced.

FIG. 1 illustrates a highly simplified diagram of satellite-based communication system 10 with which the present invention may be practiced. Communication system 10 uses six polar orbits 14, with each orbit 14 holding eleven satellite communication stations 12 for a total of sixty-six satellites 12. However, this is not essential and more or fewer satellites, or more or fewer orbits, may be used. While the present invention is advantageously employed when a large number of satellites are being used, it is also applicable with as few as a single satellite. For clarity, FIG. 1 illustrates only a few satellite communication stations 12.

For example, each orbit 14 encircles earth at an altitude of around 780 km, although higher or lower orbital altitudes may be usefully employed. Due to the relatively low orbits of exemplary satellites 12, substantially line-of-sight electromagnetic (e.g., radio, light etc.) transmission from any one satellite or reception of signals by any one satellite involves or covers a relatively small area of earth at any instant.

For the example shown, satellites 12 travel with respect to earth at around 25,000 km/hr, allowing satellite 12 to be visible to a terrestrial station for a maximum period of approximately nine minutes. Satellite communication stations 12 communicate with terrestrial stations which may include some number of radio communication subscriber units 26 and earth terminals (ETs) 24 connected to system control segment (SCS) 28. ETs 24 may also be connected to gateways (GWs) 22, which provide access to the public switched telephone network (PSTN) or other communications facilities. Only one each of GWs 22, SCS 28 and SUs 26 are shown in FIG. 1 for clarity and ease of understanding. ETs 24 may be co-located with or separate from SCS 28 or GW 22. ETs 24 associated with SCSs 28 receive data describing tracking of satellites 12 and relay packets of control information while ETs 24 associated with GWs 22 only relay data packets (e.g., relating to calls in progress).

SUs 26 may be located anywhere on the surface of the earth or in the atmosphere above the earth. SUs 26 are preferably communications devices capable of transmitting data to and receiving data from satellites 12. By way of example, SUs 26 may be hand-held, portable cellular telephones adapted to communicate with satellites 12. Ordinarily, SUs 26 need not perform any control functions for communication system 10.

Communication system 10 may accommodate any number, potentially in the millions, of subscriber units 26. In the preferred embodiments of the present invention, subscriber units 26 communicate with nearby satellites 12 via subscriber links 16. Links 16 encompass a limited portion of the electromagnetic spectrum that is divided into numerous channels. Links 16 are preferably combinations of L-Band frequency channels and may encompass Frequency Division Multiplex Access (FDMA) and/or Time Division Multiple Access (TDMA) communications or combination thereof. As a minimum, a satellite 12 continuously transmits over one or more broadcast channels 18. Subscriber units 26 synchronize to broadcast channels 18 and monitor broadcast channels 18 to detect data messages which may be addressed to them. These data messages include both ring-alerts which notify a subscriber unit that another party desires communication, as well as pages which deliver specific messages. Subscriber units 26 may transmit messages to satellites 12 over one or more acquisition channels 19. Broadcast channels 18 and acquisition channels 19 are not dedicated to any one subscriber unit 26 but are shared by all subscriber units 26 currently within view of a satellite 12.

On the other hand, traffic channels 17 are two-way channels that are assigned to particular subscriber units 26 by satellites 12 from time to time. In the preferred embodiments of the present invention, a digital format is used to communicate data over channels 17–19, and traffic channels 17 support real-time communications. At least one traffic channel 17 is assigned for each call, and each traffic channel 17 has sufficient bandwidth to support, as a minimum, a two-way voice conversation. To support real-time communications, a TDMA scheme is desirably used to divide time into frames, preferably in the 60–90 millisecond range. Particular traffic channels 17 are assigned particular transmit and receive time-slots, preferably having durations in the 3–10 millisecond range, within each frame. Analog audio signals are digitized so that an entire frame's signal is transmitted or received in a single short high speed burst during an allotted time-slot. Preferably, each satellite 12 supports up to a thousand or more traffic channels 17 so that each satellite 12 can simultaneously service a like number of independent calls.

Satellites 12 communicate with other nearby satellites 12 through cross links 23. Thus, a communication from a subscriber unit 26 located at any point on or near the surface of the earth may be routed through the constellation of satellites 12 to within range of substantially any other point on the surface of the earth. A communication may be routed down to a subscriber unit 26 on or near the surface of the earth from a satellite 12 using a subscriber link 16. Alternatively, a communication may be routed down to or up from any of many ETs 24, of which FIG. 1 shows only two, through earth links 15. ETs 24 are preferably distributed over the surface of the earth in accordance with geo-political boundaries. In the preferred embodiments, each satellite 12 may communicate with up to four ETs 24 and over a thousand subscriber units 26 at any given instant.

SCS 28 monitors the health and status of system communication nodes (e.g., GWs 22, ETs 24 and satellites 12) and desirably manages operations of communication system 10. One or more ETs 24 provide the primary communications interface between SCS 28 and satellites 12. ETs 24 include antennas and RF transceivers and preferably perform telemetry, tracking and control functions for the constellation of satellites 12.

GWs 22 may perform call processing functions in conjunction with satellites 12 or GWs 22 may exclusively handle call processing and allocation of call handling capacity within communication system 10. Diverse terrestrial-based communications systems, such as the PSTN, may access communication system 10 through GWs 22. In a preferred embodiment, ET 24 may be included in GW 22 (as discussed below in reference to FIG. 4).

With the example constellation of sixty-six satellites 12, at least one of satellites 12 is within view of each point on earth's surface at all times (i.e., full coverage of the earth's surface is obtained). Theoretically, any satellite 12 may be in direct or indirect data communication with any SU 26 or ET 24 at any time by routing data through the constellation of satellites 12. Accordingly, communication system 10 may establish a communication path for relaying data through the constellation of satellites 12 between any two SUs 26, between SCS 28 and GW 22, between any two GWs 22 or between SU 26 and GW 22.

Figure 2:
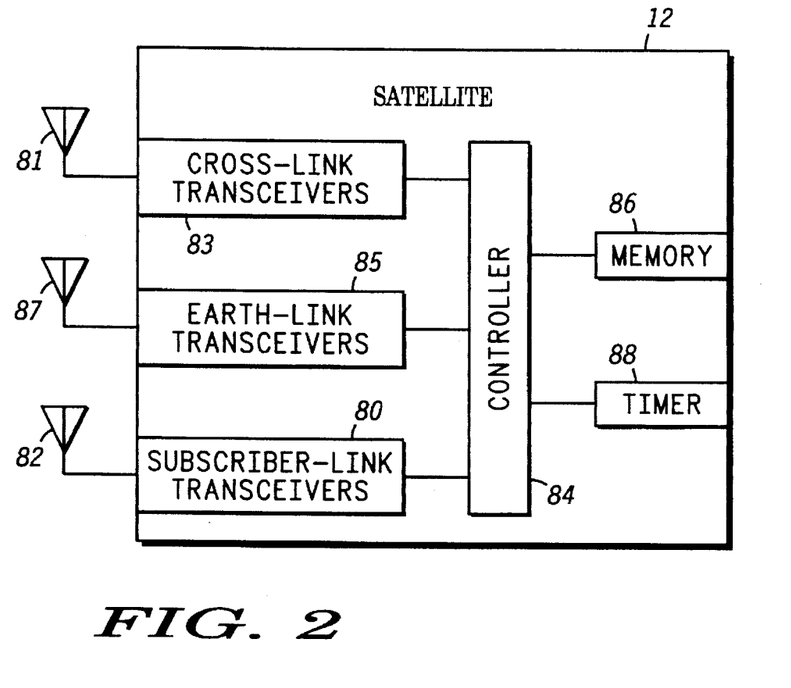
FIG. 2 illustrates a simplified block diagram of a satellite communication station suitable for use in a preferred embodiment of the present invention.
Figure 7:
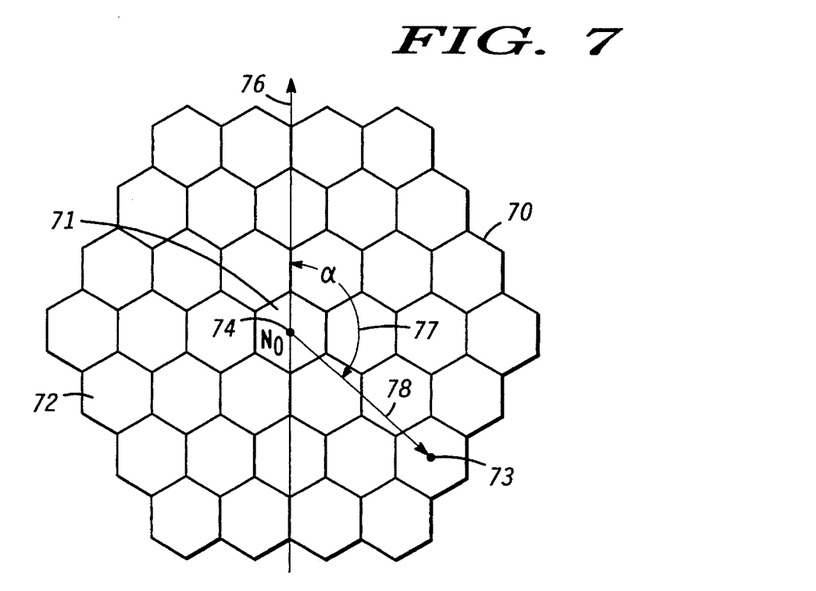
FIG. 7 illustrates a footprint of antenna beams broadcasted by a satellite communication station suitable for use in a preferred embodiment of the present invention.

FIG. 2 illustrates a simplified block diagram of satellite communication station 12 suitable for use in a preferred embodiment of the present invention. Preferably, all satellites 12 within system 10 (see FIG. 1) include equipment as illustrated by the block diagram of FIG. 2 as a minimum. Satellite 12 includes cross-link transceivers 83 and associated antennas 81. Transceivers 83 and antennas 81 support cross-links to other nearby satellites 12. Earth-link transceivers 85 and associated antennas 87 support earth-links to communicate with earth terminals 24 (FIG. 1). Subscriber-link transceivers 80 and associated antennas 82 support subscriber units 26 (FIG. 1). Preferably, each satellite 12 may simultaneously support a link for up to several thousand or more of subscriber units 26 (FIG. 1). Of course, those skilled in the art will appreciate that antennas 81, 87, and 82 may be implemented either as single multi-directional antennas or as banks of discrete antennas. It is desirable that each subscriber-link antenna 82 be a phased array antenna capable of accessing many antenna beams simultaneously. An example of this is shown in FIG. 7 discussed below.

A controller 84 couples each of transceivers 83, 85, and 80 as well as to a memory 86 and a timer 88. Controller 84 may be implemented using one or more processors. Controller 84 uses timer 88 to maintain, among other things, the current date and time. Memory 86 stores data that serve as instructions to controller 84 and that, when executed by controller 84, cause satellite 12 to carry out procedures which are discussed below. In addition, memory 86 includes variables, tables, and databases that are manipulated during the operation of satellite 12.

Subscriber-link transceivers 80 are desirably multi-channel FDMA/TDMA transceivers capable of transmitting and receiving on all different selectable frequencies during particular, selectable, time slots as directed by controller 84. Subscriber-link transceivers 80 contain multi-channel radios having a sufficient number of channels to provide the desired number of transmission and reception frequencies for signal access and control and for the user voice and/or data. Controller 84 may provide for allocation of the frequency and time-slot assignments, antenna beam-to-antenna beam hand-off and other overhead and management and control functions. Subscriber-link transceivers 80 desirably provide for transmission and reception on any frequency channel set so that each subscriber-link transceivers 80 may, if needed, utilize the entire spectral capacity of all frequency channel sets by having the capability to handle all frequency and time slot assignments.

Figure 3:
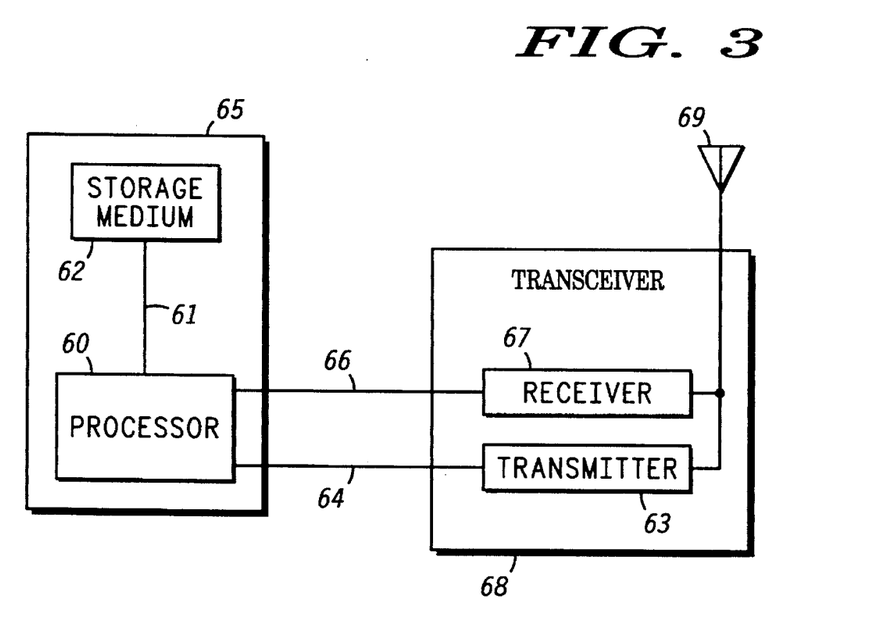
FIG. 3 illustrates a simplified block diagram of a system control station and a terrestrial station suitable for use in a preferred embodiment of the present invention.

FIG. 3 illustrates a simplified block diagram of system control station 65 and terrestrial station 68 suitable for use in a preferred embodiment of the present invention. Control station 65 and terrestrial station 68 are desirably part of SCS 28 (FIG. 1) and may also be part of ET 24 and GW 22 (FIG. 1) respectively. Control station 65 comprises processor 60 coupled to associated storage medium 62 (e.g., random access memory or RAM, other semiconductor or magnetic read-write memory devices, optical disk, magnetic tape, floppy disk, hard disk etc.) via link 61. Terrestrial station 68 includes antenna 69 coupled to transmitter 63 and receiver 67. Transmitter 63 and receiver 67 are coupled to processor 60 via links 64 and 66, respectively. Processor 60 desirably carries out procedures exemplified below and described in the associated text. For example, in addition to performing other tasks as appropriate, processor 60 desirably stores results from such procedures in storage medium 62. Transmitter 63 and/or receiver 67 transmit messages to and/or receive messages from satellites 12.

Processor 60 generally controls and manages user access, message reception and transmission, channel setup, radio tuning, frequency and time slot assignment, and other cellular radio communication and control functions not managed or provided for by controller 84 (FIG. 2). Among other things, processor 60 and/or controller 84 (FIG. 2) desirably executes procedures to allow user access to communication system 10. This may include procedures for protocols for channel setup and other associated functions as discussed below.

Figure 4:
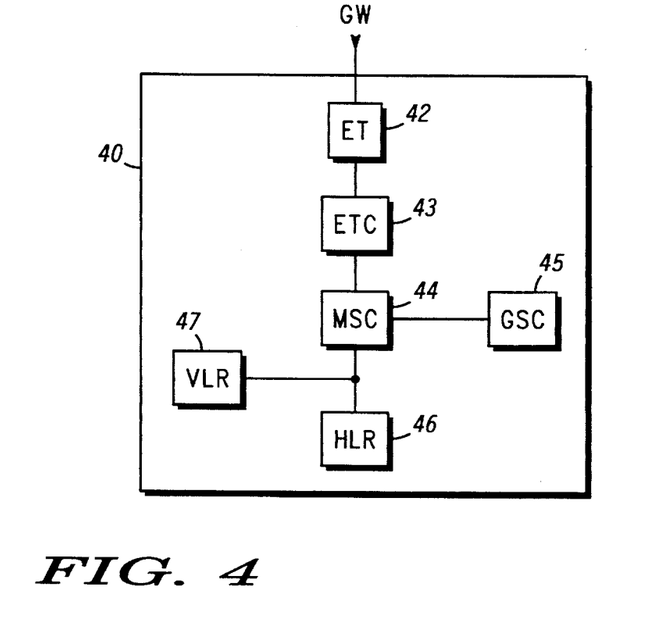
FIG. 4 illustrates a functional block diagram of a gateway suitable for use in a preferred embodiment of the present invention.

FIG. 4 illustrates a functional block diagram of a gateway suitable for use in a preferred embodiment of the present invention. Gateway 40 is analogous to gateway 22 of FIG. 1. Gateway 40 may desirably include earth terminal 42 which is analogous to ET 24 (FIG. 1). Gateway 40 may also include earth terminal controller (ETC) 43 analogous to terrestrial station 68 (FIG. 3) which interfaces mobile switching center (MSC) 44 to the constellation. ETC 43 provides functions not supported by MSC 44 including a logical interface between subscriber units and MSC 44. ETC 43 processes signaling data and routes traffic data exchanged between subscriber units and MSC 44. The principle functions of ETC 43 include managing the radio channels and transferring signaling information to and from subscriber units. When the type of call handling or signaling does not directly affect ETC 43, ETC 43 desirably serves as a relay between a subscriber unit and MSC 44.

MSC 44 is preferably similar to a telephone switching office for mobile originated and mobile terminated calls. MSC 44 provides an interface to a PSTN, and to the terrestrial circuits of ETC 43. MSC 44 communicates and passes signaling and traffic data to ETC 43 which provides for remote switching, distributed control, and traffic concentration. MSC 44 also provides call control functions such as number translations and routing, matrix path control, and allocation of outgoing trunks. MSC 44 may also collect call billing data, format data into records, and send these records to a billing center. MSC 44 may also collect traffic statistics for performance and management purposes.

Home location register (HLR) 46 is a data base which manages subscriber data and keeps track of a subscriber unit's location as the subscriber unit roams around the earth. HLR 46 is a reference data base for subscriber parameters. Various identification numbers and addresses are stored within HLR 46, as well as authentication parameters, services subscribed, and special routing information. Current subscriber status is also preferably maintained, including a subscriber's temporary roaming number and associated visitor location register (VLR) 47 when roaming. This data may be remotely accessed by the MSCs and VLRs. HLR 46 desirably includes an authentication center which is responsible for protecting against fraudulent system use.

VLR 47 is a data base which preferably contains a copy of most of the data stored at HLR 46. This data is a temporary entry which exists only as long as a particular subscriber is known to be operating within the area served by VLR 47. VLR 47 provides a local data base for a subscriber which eliminates unnecessary interrogations of HLR 46. VLR 47 may contain some duplicate HLR data as well as more precise location information and status. VLR 47 preferably manages subscriber unit data and keeps track of subscriber unit's locations.

Gateway switching center (GSC) 45 provides switching functions for gateway 40. GSC 45 may use Group Special Mobile (GSM) system elements which desirably include of the following network elements: MSC 44, HLR 46, VLR 47, and an equipment identity register (not shown).

In a preferred embodiment of the present invention, a party accesses a subscriber unit by calling the called user's mobile subscriber directory number or mobile subscriber integrated services directory number which uniquely identifies one, and only one subscriber unit. A gateway identifies a location of the called subscriber unit by querying the called party's HLR. The gateway identifies a temporary mobile subscriber identification (TMSI) associated with the called subscriber unit. The HLR in conjunction with an associated VLR provide a location code associated the called party. The location code is used by the gateway to identify the particular satellite that may be currently servicing the particular location where the called subscriber unit is believed to be located. The gateway sends notification to the satellite which broadcasts a ring-alert message within certain antenna beams. The gateway's notification to the satellite preferably includes the called subscriber unit's TMSI.

Figure 5:
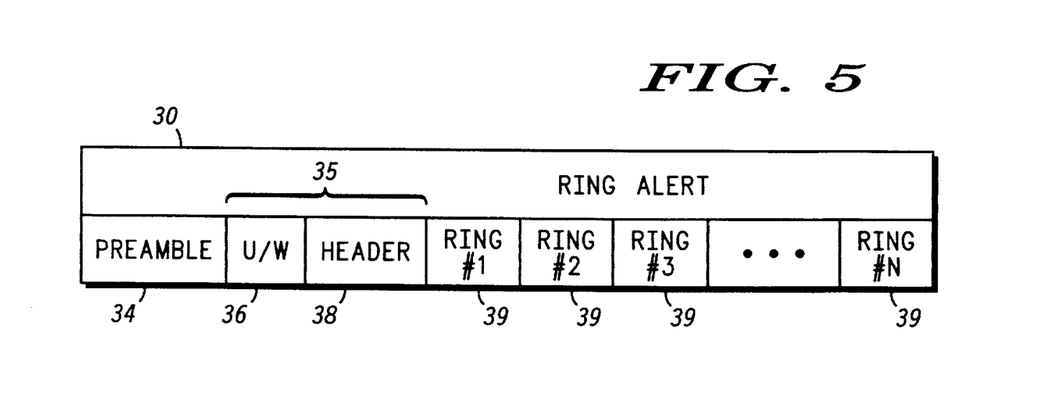
FIG. 5 shows a diagram of a ring-alert message suitable for use in a preferred embodiment of the invention.

FIG. 5 shows a diagram of ring-alert message 30 suitable for use in a preferred embodiment of the invention. Communication system 10 (FIG. 1) uses broadcast channel 18 (FIG. 1) to inform subscriber units 26 of incoming calls. In a preferred embodiment, ring-alert message 30 comprises a preamble 34, control information 35, and a list of subscriber unit IDs 39. Preamble 34 facilitates the acquisition of ring-alert message 30 and in a preferred embodiment is a fixed period of unmodulated carrier frequency.

In a preferred embodiment, control information 35 comprises a unique word 36 and a header 38. Unique word 36 uniquely identifies a communications command between subscriber units 26 and satellites 12. Header 38 comprises satellite ID, antenna beam ID, antenna beam geographic location, next ring-alert interval, and beam specific broadcast channel frequency and time slot information. Subscriber units 26 may use antenna beam geographic location information rather than received power measurements for calculating a servicing antenna beam.

Subscriber unit IDs 39 indicate a request for communication with a subscriber unit located within a specific antenna beam. When a subscriber unit detects a subscriber unit ID 39 matching its own, subscriber unit 26 notifies the satellites of its availability to receive the call.

Satellite communication stations 12 (FIG. 1) individually transmit ring-alert messages 30 to antenna beams in sequential subscriber-link frames. Since satellites 12 will only "ring" (send a subscriber unit ID) a subscriber unit in a specific antenna beam, subscriber units 26 need only monitor the ring-alert channel within which subscriber unit 26 is located.

In the preferred embodiment, satellite 12 sends ring-alerts within each of its antenna beams serially, rather than sending ring-alerts within all beams at the same time. In this way, each antenna beam may have a unique set of ring-alerts directed to specific subscriber units located within each beam.

Figure 6:
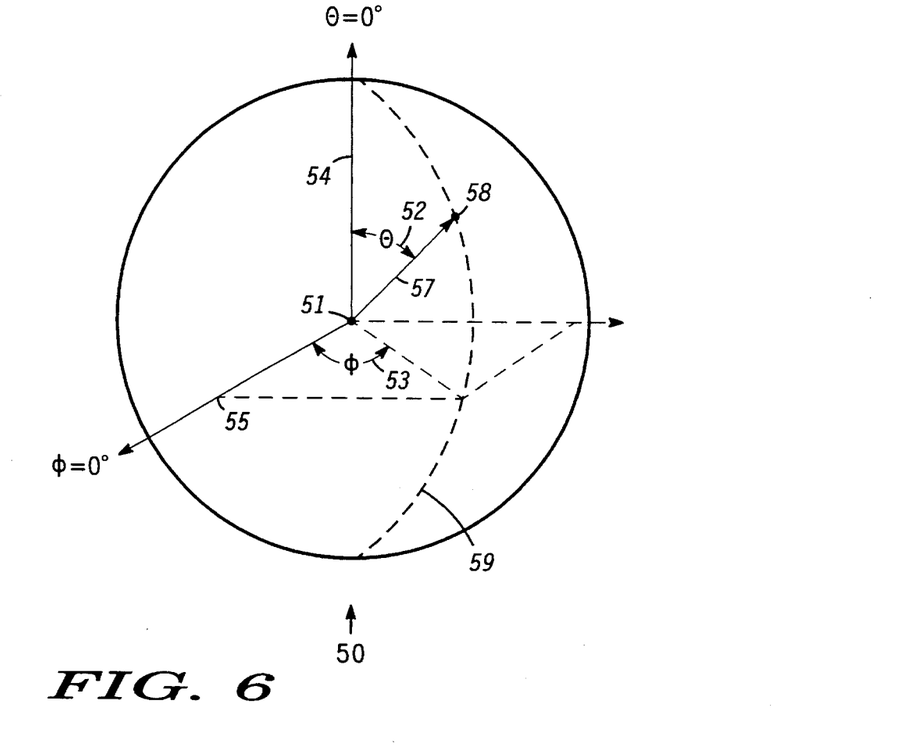
FIG. 6 shows a diagram of a coordinate system used to represent a ground location on earth's surface in a preferred embodiment of the present invention.

FIG. 6 shows a diagram of coordinate system 50 used to represent a ground location on earth's surface in a preferred embodiment of the present invention. The example of coordinate system 50 is used for satellites that are in polar orbits (i.e., crossing over the north and south poles). Coordinate system 50 may be used to represent any ground location on earth's surface using earth's center point 51 as a reference. Thus, coordinate system 50 can be used to represent the instantaneous location of a subscriber unit. For the example of FIG. 6, a subscriber unit located at point 58 has an associated vector 57. Vector 57 passes through the earth's center point 51 and is defined by angles theta θ and phi φ, shown as angles 52 and 53 respectively. Theta 52 is the angle between vector 54 which projects from the center of earth 51 through the north pole, and vector 57. Phi 53 is the longitudinal angle between vector 55 which projects from the center of the earth 51 through the equator at a reference longitude, and vector 57. For the example shown in FIG. 6, the reference longitude is at the zero degree. For this example, the center of an antenna beam footprint (i.e., the nadir beam footprint) projected by a satellite, at a given time, is preferably in line with the earth's longitude, shown as line 59. Point 58, therefore, may also represent the ground location projection of the nadir of a satellite at an instant in time.

In the preferred embodiment, each angle 52 and 53 is represented by eight-bits, and desirably sixteen bits for greater accuracy. Using an eight bit representation results in a granularity of twenty arc-seconds which is approximately 670 meters at a 40-degree latitude area in the configuration shown in FIG. 1. In another preferred embodiment, nine-bits are used for angle θ and ten-bits is used for angle φ. This results in a location granularity of twenty-one arc-minutes, which is approximately 20 nautical miles at the equator. Thus a subscriber unit's geographic identification (GID) comprises, at a minimum, the angles θ and φ.

The coordinate system of FIG. 6 does not consider the variation of the earth's radius. The error introduced by this is negligible because a subscriber unit's location is referenced to the nearest ground projection of a nearest satellite's center beam location discussed below. In the preferred embodiment, the maximum radius of each satellite's projected beams is approximately eleven-hundred nautical miles. Therefore, the difference between the two earth radii due to the variation in the earth's radius is not significant.

A subscriber unit's location is preferably stored within a gateway. When a subscriber unit registers with a local gateway, the subscriber unit's geographic location is recorded. Registration can occur in several ways, including when a subscriber unit places a call or the subscriber unit is turned on. In a preferred embodiment, when a subscriber unit is not roaming and not registered at a gateway that is not the home gateway, a subscriber unit is presumed to be located in a region serviced by the home gateway. In a preferred embodiment, a subscriber unit's geographic location is converted to coordinates of coordinate system 50 and stored in a gateway. Alternatively, a subscriber unit's geographic location may be stored in another form in the gateway where it is easily converted to coordinates of coordinate system 50 when necessary.

A satellite's location information is provided by onboard subsystems that continually provide data to SCS 28 (FIG. 1). The location information is preferably converted or stored in the coordinates of coordinate system 50. A satellite's location is identified by its nadir location projected on the earth's surface. The nadir vector of each satellite may also be defined by the angles theta and phi, similar to subscriber unit vector 57 shown in FIG. 6.

FIG. 7 illustrates footprint 70 of antenna beams broadcasted by a satellite communication station suitable for use in a preferred embodiment of the present invention. Footprint 70 includes a plurality of antenna beams 72. Antenna beams 72 represent the antenna patterns transmitted by subscriber-link antennas 82 (FIG. 2). Antenna beams 72 are shown as hexagonal in shape for illustrative purposes only. Those of skill in the art will understand that because antenna beams 72 represent antenna patterns broadcasted from a satellite onto the surface of the earth, the beams may be more circular or elliptical in shape. As discussed in reference to the preferred embodiment of FIG. 1, footprint 70 is moving across the surface of the earth as the satellite transmitting the footprint moves through its orbit 14 (FIG. 1). As a result, a subscriber unit located on the surface of the earth may only be located within any particular beam for a short amount of time. In the preferred embodiment, the size of antenna beams 72 may range from as small as a few miles across, to as great as several hundred miles across.

Satellites transmit acquisition signals and issue ring-alerts within antenna beams 72 by sending ring-alert messages 30

(FIG. 5) discussed above. Terrestrial cellular communication systems generally issue ring-alerts for a specific subscriber unit in all cells associated with a particular communication station. This is inefficient because a subscriber to whom the message is directed is generally located within only one of antenna beams 72. In the example of FIG. 7, the subscriber unit to whom a message is directed may be at the location of point 73.

The present invention, among other things, eliminates the power wasted in the broadcasting of ring-alerts by preferably transmitting ring-alerts and acquisition signals only where a specific subscriber unit is located.

A satellite's nadir vector, for example represented as vector 57 (FIG. 6), passes through footprint center point 74. Footprint center point is herein referred to as Nadir point (No) 74. A subscriber unit's location at point 73 in footprint region 70 is defined by two parameters: vector 78, and angle alpha ($\alpha$) 77. Vector 78 is the ground distance vector from nadir point 74 to point 73 where a subscriber is believed to be located. Angle 77 is the angle between the satellite's flight path projected onto the earth's surface, shown as vector 76, and vector 78. In the preferred embodiment, if a message is routed to the correct satellite, vector 78 will be less than eleven-hundred nautical miles for this example, and angle 77 will always be less than 360 degrees.

A subscriber unit's location is transformed from the coordinate system 50 (FIG. 6), to a location in footprint region 70 (FIG. 7) as follows:

The Nadir location in coordinate system 50 (FIG. 6) may be defined as $N_o=(\theta o, \phi o)$. This represents the location of a point on the surface of the earth. The Nadir location of the coordinate system of footprint region 70 may be defined as vector $No=(O, O)$. This represents the location of center of footprint region 70 (See FIG. 7). A subscriber unit's location at point 58 in coordinate system 50 is represented by vector $P_B=(\theta_B, \phi_B)$. A subscriber unit's location at point 73 in the coordinate system of footprint region 70 is represented by vector $P_B=(R, \alpha)$, where vector R=vector $P_B$–vector 78.

Thus, a subscriber unit's location can easily be transformed from coordinate system 50 to the coordinate system of footprint region 70. Determining the correct antenna beam can be predicted because each satellite knows the position of each of its antenna beams relative to its nadir vector. The transformation of coordinate systems is desirably performed by a dedicated processor onboard the satellite, and preferably by a specialized chip. The value of each antenna beam's range and angle is desirably stored in antenna beam look-up tables (LUTs). Multiple LUTs are used to accommodate situations where antenna beams from adjacent satellites overlap, for example, as when satellite 12 (FIG. 1) are in polar orbits and approach the poles. In the preferred embodiment, different LUTs are used depending on the latitude location of the satellite. LUTs preferably also incorporate situations where some antenna beams are turned off as the satellites approach the poles.

Using the above discussed coordinate systems, when a subscriber unit is calculated to have a ground range (R) greater than the maximum ground range of footprint region 70 as shown in the LUT, the message must have been sent to the wrong satellite. By checking the calculated angle and ground range, the satellite can route that message to another neighboring satellite.

Those of skill in the art will understand that the present invention is not limited to one specific configuration of satellites, satellite orbital angle, and configuration of antenna beams, but that it is applicable to configurations with any number of satellites which have any number of antenna beams, and that travel in any orbital inclination.

Figure 8:
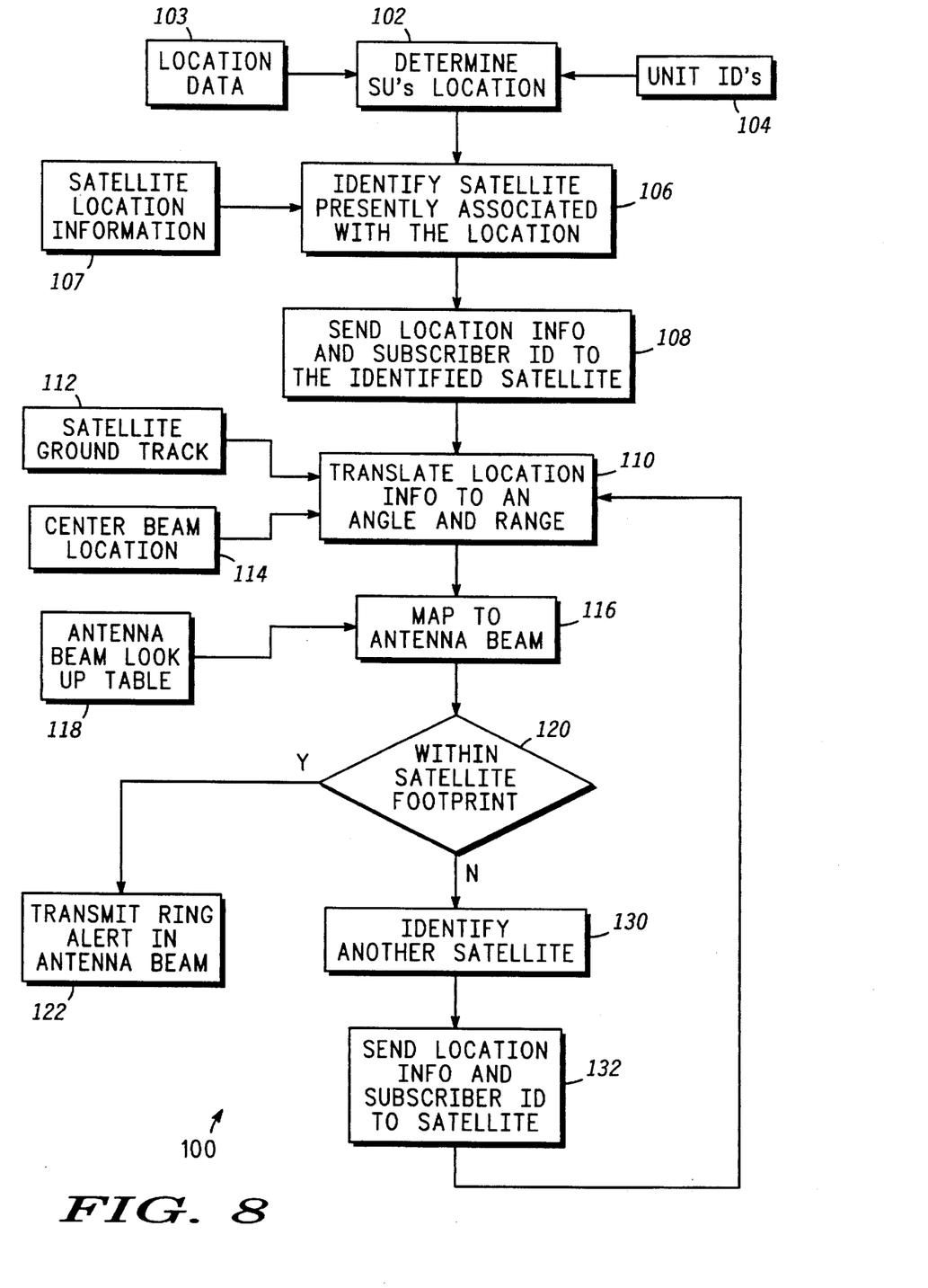
FIG. 8 shows a flow chart of a dynamic mapping procedure suitable for use in a preferred embodiment of the present invention.

FIG. 8 shows a flow chart of a dynamic mapping procedure suitable for use in a preferred embodiment of the present invention. Subscriber units that wish to receive calls and pages using system 10 (FIG. 1) are registered with their home gateway as authorized users. When a subscriber unit moves to different locations on the earth (roams), the subscriber registers with a visiting gateway. Registration may occur when the subscriber unit is turned on, or when the subscriber places a call from the location. The visiting gateway stores a geographic location associated with the roaming subscriber.

In one embodiment of the present invention, the geographic location of a subscriber unit is determined based on the specific antenna beam of the satellite within which the subscriber unit last registered. In another embodiment of the present invention, the geographic location of a subscriber unit is calculated by an embedded receiver that receives signals from a global positioning system (GPS). Once the subscriber unit's power is turned on, a message including the geographic location of the subscriber unit is sent to a visiting gateway. In this way, the subscriber unit's home gateway is informed of the subscriber unit's geographic location.

When a request for ring-alert or a page is received at an originating gateway by a calling party, the originating gateway sends a message to the home gateway of the called subscriber unit. The home gateway of the called subscriber unit then provides the geographic location of the called subscriber unit to the originating gateway. In task 102, the originating gateway determines the called subscriber unit's geographic location by providing the home gateway with the subscriber unit's unique identification 104. Location data 103 is preferably stored in called subscriber unit's home gateway. Task 102 preferably converts the subscriber unit's geographic location to location coordinates of a global coordinate system. Coordinate system 50 (FIG. 6) is suitable. The location coordinates comprise a first and second angle identifying a unique position on the surface of earth. In task 106, the originating gateway identifies a satellite which is presently broadcasting over the called subscriber unit's geographic location. Satellite location information 107 is provided to all gateways 22 of system 10 through SCS 28 (See FIG. 1). In task 108, a message is sent to the satellite identified in task 106 which includes the called subscriber unit's location information along with the subscriber identification. The message sent in task 108 may also include a command to issue a ring-alert or a paging message.

In task 110, the satellite translates the location information to a range and angle relative to the satellite's ground track or flight path. The satellite maintains its ground track data 112 along with its center beam location 114. Preferably, the location data is transformed to a range (R) and angle $\alpha$, as discussed above in relation to coordinate system 50 and footprint region 70. In task 116, the angle and range data are mapped to a specific antenna beam or beams. In the preferred embodiment, an antenna beam look-up table (LUT) 118 as discussed above is used.

Task 120 determines if based on the range and the angle, the location of the called subscriber unit is within the satellite's footprint (i.e., within a specific antenna beam or cell). If it is within the satellite's footprint, the ring-alert or page is transmitted within the antenna beam identified in task 116. When the called subscriber unit's location is not within the footprint of the satellite, another satellite is identified in task 130. In most situations, this will be an adjacent satellite based on the angle α. In task 132, the called subscriber unit's identification and location information are sent to the other satellite. This other satellite preferably has the called subscriber unit located within its footprint. This satellite performs tasks 110 through task 132 as did the original satellite so that the ring-alert or page may be transmitted down to the called subscriber unit.

While the invention has been described in terms of specific examples and with specific preferred embodiment, it is evident that many alternatives and variations will be apparent to those skilled in the art based on the description herein, and is intended to include such variations and alternatives in the claims.

As described herein, the advantages of the present invention will be apparent to those of skill in the art and provides improved methods of operating various parts of a communication system. These advantages include reduced power consumption in an environment where the energy available is extremely limited. The advantages also include reduced power consumption by directing ring-alerts and pages to a specific antenna beam (or cell) where a subscriber unit is located. Furthermore, the invention provides a very quick method of identifying an antenna beam where the subscriber unit is located by transforming the subscriber unit's location from one coordinate system to another and mapping the coordinates to an antenna beam. Furthermore, the invention reduces delays associated with subscriber unit ring-alert and acquisition.

What is claimed is:

1. In a communication system having a gateway and non-geostationary satellite nodes, each providing a plurality of antenna beams that move with respect to earth's surface, a method of identifying one of said antenna beams in which a subscriber unit is located comprising the steps of:

(a) determining a geographic location of said subscriber unit by said gateway, said geographic location being in earth-based coordinates;

(b) identifying a satellite node having a footprint region presently servicing said geographic location, said footprint region being defined by ground projections of said plurality of antenna beams provided by said satellite node;

(b1) sending said earth-based coordinates to said satellite node;

(b2) converting, at said satellite node, said earth-based coordinates to satellite-based coordinates, said satellite-based coordinates being relative to said identified satellite node;

(c) mapping said satellite-based coordinates to a first antenna beam provided by said satellite node; and (d) transmitting an acquisition signal to said subscriber unit in said first antenna beam.

2. A method as claimed in claim 1 wherein said identified satellite node has said footprint region presently servicing said geographic location, and wherein each satellite node is an orbiting satellite that has movement with respect to earth's surface.

3. A method as claimed in claim 2 wherein the identifying step includes the step of identifying said satellite node based on ground track data of said plurality of satellite nodes, said ground track data being stored in a satellite control facility that provides said ground track data to said gateway that performs the identifying step.

4. A method as claimed in claim 3 wherein:

the determining step further comprises the step of converting, at said gateway, said geographic location to said earth-based coordinates, said earth-based coordinates comprising a first and second angle relative to a vector through earth's center identifying a unique position on earth's surface; and the converting step further comprises the step of translating, at said satellite node, said earth-based coordinates into said satellite-based coordinates, said satellite-based coordinates comprising a third angle and a range, said third angle and said range being relative to a nadir vector of said identified satellite node, said nadir vector passing substantially through a center point of said footprint region, and the mapping step comprises the step of mapping said third angle and said range to said first antenna beam.

5. A method as claimed in claim 4 wherein each of said antenna beams provided by said identified satellite node have angles and ranges associated therewith relative to said nadir vector, said angles and ranges associated with each of said antenna beams being stored in said identified node, and wherein the mapping step comprises the step of mapping said third angle and said range to said first antenna beam based on said angles and ranges stored in said satellite node.

6. A method as claimed in claim 4 wherein each satellite node is an orbiting satellite that has movement with respect to earth's surface, and wherein the mapping step comprises the step of looking up said angle and range in a look-up table stored in said satellite node, and wherein said range represents a ground range vector from said center point of said footprint region, and said third angle is between a flight path projection vector of said satellite node and said ground range vector.

7. A method as claimed in claim 1 further comprising the step of receiving a ring-alert request at said gateway, said ring-alert request being initiated by a calling party, and wherein the determining step includes the step of determining said geographic location based on a registration of said subscriber unit in response to the receipt of said ring-alert request.

8. A method as claimed in claim 7 wherein the determining step includes the step of determining said geographic location based on a termination of a prior call by said subscriber unit.

9. A method as claimed in claim 7 wherein the sending step further comprises the step of sending a subscriber ID which uniquely identifies said subscriber unit to said identified satellite node, and wherein the transmitting step further comprises the step of transmitting said subscriber ID within said first antenna beam.

10. A method as claimed in claim 9 wherein the transmitting step further comprises the step of transmitting a ring-alert message directed to said subscriber unit in said first antenna beam, said ring-alert message including said subscriber ID.

11. A method as claimed in claim 4 further comprising the step of (e) determining by said identified satellite node, whether said range is within said footprint region of said identified satellite node.

12. A method as claimed in claim 11 further comprising the steps of:

identifying a second satellite node of said communication system having a second footprint region when step (e) determines that said range is not within said footprint region, said geographic location being within said second footprint region; and sending said earth-based coordinates to said second satellite node.

13. A method as claimed in claim 12 further comprising the steps of:

mapping said earth-based coordinates to a second antenna beam associated with said second footprint region; and transmitting said acquisition signal to said subscriber unit in said second antenna beam.

14. A method as claimed in claim 13 further comprising the steps of updating a nadir location of said second satellite node and sending said nadir location to a satellite control facility, the updating step being performed by a navigation processor located on said second satellite node, said nadir location being associated with a center point of said second footprint region.

15. A communication system comprising:

a communication node that provides a plurality of antenna beams, said communication being in non-geostationary orbit, said communication node having a footprint region defined by ground projections of said antenna beams; and a gateway that comprises:

means for determining a geographic location of a subscriber unit, said geographic location being in earth-based coordinates; and means for sending said earth-based coordinates to said communication node, said communication node having been identified as having said footprint region servicing said geographic location, and said communication node includes means for converting said earth-based coordinates to satellite-based coordinates, said satellite-based coordinates being relevant to said communication node means for mapping said earth-based coordinates to a first antenna beam of said plurality of antenna beams provided by said satellite node; and means for transmitting an acquisition signal to said subscriber unit in said first antenna beam.

16. A communication system as claimed in claim 15 wherein said gateway includes means for identifying said communication node from a plurality of communication nodes, wherein said communication node has said footprint region servicing said geographic location, and wherein each of said communication nodes is an orbiting satellite communication station that has movement with respect to earth's surface.

17. A communication system as claimed in claim 16 wherein said gateway includes means for identifying said communication node based on ground track data of said communication node and said geographic location, said ground track data being stored in a satellite control facility that provides said ground track data to said gateway.

18. A communication system as claimed in claim 17 wherein:

said gateway includes means for converting said geographic location to said earth-based coordinates, said earth-based coordinates comprising a first and second angle relative to a vector through earth's center identifying a unique position on earth's surface; and said communication node includes means for translating said earth-based coordinates into said satellite-based coordinates, said satellite-based coordinates comprising a third angle and a range, said third angle and said range being relative to a nadir vector of said communication node, said nadir vector passing through a center point of said footprint region, and said means for mapping includes means for mapping said third angle and said range to said first antenna beam.

19. A communication system as claimed in claim 18 wherein each of said antenna beams has angles and ranges of said satellite-based coordinates associated therewith relative to said nadir vector, said angles and ranges associated with each of said antenna beams being stored in said communication node.

20. A communication system as claimed in claim 19 wherein said communication node has a storage means for storing said angles and ranges in a look-up table that associates said angles and ranges with one of said antenna beams, and wherein each of said ranges is a ground range vector from said center point of said footprint region, and each of said angles is between a flight path projection vector of said communication node, and said ground range vector.

21. A method of dynamically mapping location information between coordinate systems comprising the steps of:

determining a geographic location of a subscriber unit in a first coordinate system, said geographic location defined by a first and second angle relative to a vector through earth's center;

translating said first and second angle to a second coordinate system to arrive at a third angle and a range, said third angle and said range being relative to a nadir vector of an orbiting communication station, wherein said orbiting communication station has a footprint region servicing said geographic location;

identifying an antenna beam within said footprint region based on said third angle and range; and transmitting a signal within said antenna beam from said orbiting communication station to said subscriber unit.

22. A method as claimed in claim 21 wherein said orbiting communication station has a plurality of antenna beams associated therewith, said antenna beams being projected onto earth's surface and defining said footprint region, said method further comprising the step of mapping said third angle and said range to said antenna beam using a look-up table stored in said orbiting communication station, said look-up table associating each antenna beam of said plurality with angles and ranges relative to said satellite's nadir vector.

* * * * *